US008572516B1

(12) United States Patent
Mitchell

(10) Patent No.: US 8,572,516 B1
(45) Date of Patent: Oct. 29, 2013

(54) SYSTEM AND METHOD FOR CONTROLLING A SCREEN SAVER

(75) Inventor: Brian Mitchell, Stamford, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 961 days.

(21) Appl. No.: 11/209,642

(22) Filed: Aug. 24, 2005

(51) Int. Cl.
G06F 3/00 (2006.01)
G06F 3/048 (2013.01)

(52) U.S. Cl.
USPC .......................... 715/867; 715/740; 715/747

(58) Field of Classification Search
USPC ................... 715/867, 765, 745, 747, 740, 741
See application file for complete search history.

(56) References Cited

U.S. PATENT DOCUMENTS

| | | | |
|---|---|---|---|
| 4,751,702 A | 6/1988 | Beier et al. | |
| 5,027,269 A | 6/1991 | Grant et al. | |
| 5,075,881 A | 12/1991 | Blomberg et al. | |
| 5,313,616 A | 5/1994 | Cline et al. | |
| 5,347,518 A | 9/1994 | Lee | |
| 5,386,551 A | 1/1995 | Chikira et al. | |
| 5,446,895 A | 8/1995 | White et al. | |
| 5,539,885 A | 7/1996 | Ono et al. | |
| 5,549,117 A | 8/1996 | Tacklind et al. | |
| 5,563,998 A | 10/1996 | Yaksih et al. | |
| 5,566,297 A | 10/1996 | Devarakonda | |
| 5,594,863 A | 1/1997 | Stiles | |
| 5,630,047 A | 5/1997 | Wang | |
| 5,630,069 A | 5/1997 | Flores et al. | |
| 5,655,074 A | 8/1997 | Rauscher | |
| 5,701,471 A | 12/1997 | Subramanyam | |
| 5,712,971 A | 1/1998 | Stanfill et al. | |
| 5,721,913 A | 2/1998 | Ackroff et al. | |
| 5,721,914 A | 2/1998 | De Vries | |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,819,284 A * | 10/1998 | Farber et al. ................... | 709/203 |
| 5,828,883 A | 10/1998 | Hall | |
| 5,835,770 A | 11/1998 | Shum et al. | |
| 5,842,196 A | 11/1998 | Agarwal et al. | |

(Continued)

FOREIGN PATENT DOCUMENTS

WO   WO 01/74043   10/2001

OTHER PUBLICATIONS

Duggan, 2.40 General—Reviews and Abstracts, SPI Database of Software Technologies, p. 1-5, Feb. 1, 1974.

(Continued)

Primary Examiner — Weilun Lo
Assistant Examiner — Truc T Chuong
(74) Attorney, Agent, or Firm — Goodwin Procter LLP

(57) ABSTRACT

A system and method for coordinating screen saver initiation and functionality. The system comprises at least one client station, each of the at least one client station having a screen saver module associated therewith; and a central control station in communication with each of the at least one client station over a network, the central control station having a screen saver control module for controlling each of the screen saver modules associated with the at least one client station.

19 Claims, 13 Drawing Sheets

(56) References Cited

U.S. PATENT DOCUMENTS

| | | | |
|---|---|---|---|
| 5,845,292 A | 12/1998 | Bohannon et al. | |
| 5,872,976 A | 2/1999 | Yee et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,905,492 A * | 5/1999 | Straub et al. | 715/744 |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,995,965 A | 11/1999 | Experton | |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,061,503 A | 5/2000 | Chamberlain | |
| 6,061,686 A | 5/2000 | Gauvin et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,125,390 A | 9/2000 | Touboul | |
| 6,128,708 A | 10/2000 | Fitzpatrick et al. | |
| 6,138,112 A | 10/2000 | Slutz | |
| 6,145,121 A | 11/2000 | Levy et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,256,008 B1 * | 7/2001 | Sparks et al. | 715/808 |
| 6,269,479 B1 | 7/2001 | Puram | |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,363,499 B1 | 3/2002 | Delo et al. | |
| 6,363,524 B1 | 3/2002 | Loy | |
| 6,392,671 B1 * | 5/2002 | Glaser | 715/765 |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,424,981 B1 | 7/2002 | Isaac et al. | |
| 6,438,749 B1 | 8/2002 | Chamberlain | |
| 6,445,400 B1 * | 9/2002 | Maddalozzo et al. | 715/803 |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,626,953 B2 | 9/2003 | Johndrew et al. | |
| 6,629,266 B1 | 9/2003 | Harper et al. | |
| 6,697,840 B1 * | 2/2004 | Godefroid et al. | 709/205 |
| 6,820,088 B1 | 11/2004 | Hind et al. | |
| 7,024,214 B2 * | 4/2006 | Loveland | 455/502 |
| 2002/0004912 A1 | 1/2002 | Fung | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |
| 2002/0162090 A1 | 10/2002 | Parnell et al. | |
| 2002/0165754 A1 | 11/2002 | Tang et al. | |
| 2003/0004848 A1 | 1/2003 | Hellerstein et al. | |
| 2003/0018952 A1 | 1/2003 | Roetzheim | |
| 2003/0033586 A1 | 2/2003 | Lawler | |
| 2003/0041000 A1 | 2/2003 | Zajac et al. | |
| 2003/0120539 A1 | 6/2003 | Kourim et al. | |
| 2003/0144868 A1 | 7/2003 | MacIntyre et al. | |
| 2003/0177075 A1 * | 9/2003 | Burke | 705/27 |
| 2003/0188290 A1 | 10/2003 | Corral | |
| 2003/0196190 A1 | 10/2003 | Ruffolo et al. | |
| 2003/0212518 A1 | 11/2003 | D'Alessandro et al. | |
| 2003/0225662 A1 | 12/2003 | Horan et al. | |
| 2003/0225663 A1 | 12/2003 | Horan et al. | |
| 2005/0060580 A1 * | 3/2005 | Chebolu et al. | 713/201 |
| 2005/0071807 A1 | 3/2005 | Yanai | |
| 2005/0240961 A1 * | 10/2005 | Jerding et al. | 715/867 |
| 2007/0078769 A1 * | 4/2007 | Way | 705/51 |

OTHER PUBLICATIONS

Agostini et al., A Light Workflow Management System Using Simple Process Models, Cooperation Technologies Laboratory, Disco-University of Milano-Bicoca, Aug. 2000.

Georgakopoulos et al., An Overview of Workflow Management: from Process Modeling to Workflow Automation Infrastructure, Kluwer Academic Publishers, Boston, Distributed Parallel Databases, vol. 3, p. 119-153, 1995.

Sammet, Beginning of 4.6 Software Evaluation, Tests and Measurements and RMF I/O Time Validation, Association of Computing Machinery, p. 519, Nov. 1, 1981.

Betwixt: Turning Beans into XML, Apache Software Foundation, archived Jun. 20, 2002 at <http://web.archive.org/web/20020620000410/http://jakarta.apahce.org.commons/betwixt/>, p. 1 of 1, Nov. 13, 2005.

Muehlen, Business Process Automation and Workflow in the Financial Industry, CSK Software AG, Version 3, p. 1-37, Sep. 10, 2003.

Castor: Using Castor XML, ExoLab Group, archived Aug. 27, 2001 at <http://web.archive.org/web/20011019155934/http://www.castor.org/xml-framework.html>, retrieved from the internet on Nov. 11, 2005.

Code Generation for Database Applications, IBM Corporation, p. 1-3, Mar. 1, 2002.

Mohapatra et al., Defect Prevention through Defect Prediction: A Case Study at Infosys, Nov. 7, 2001.

Hilbert, Hilbert, et al., An Approach to Large Scale Collection of Application Usage Data Over the Internet, Software Engineering 1998, Proceedings of the 1998 International Conference, Abstract, Apr. 1998.

Hudeponhl et al., Integrating Metrics and Models for Software Risk Assessment, The Seventh International Symposium on Software Reliability Engineering (ISSRE '96), p. 93, Oct. 30, 1996.

Hamilton, JavaBeans, Sun Microsystems, Chapter 8, Aug. 8, 1997.

Reinhart, Liability Management: A new Tool for Financial Consultants, Financial Consultant, vol. 1, No. 3, p. 7-11, Fall/Winter 1996, ISSN 1091-644X, Dialog File 15, Accession No. 01395382, Sep. 1996.

OS/2EE Database Manager SQLJRA Remote Protocol, IBM Corporation, IBM TDB N10-93, p. 33-36, Jan. 1, 1993.

Quantitative Monitoring of Software Development by Time-Based and Intercheckpoint Monitoring, Software Engineering Journal, vol. 5, Iss. 1, p. 43-49, Abstract, Jan. 1990.

Campione, et al., Special Edition Using Java Tutorial, Third Edition: A Short Course on the Basics, Addison Wesley Professional ISBN: 0201-70393-9, 21 pages from Chapter 5, Dec. 28, 2000.

Basili et al., Understanding and Predicting the Process of Software Maintenance Releases, 18th International Conference on Software Engineering (ICSE '96), Mar. 25-29; p. 464; (Abstract).

(56) References Cited

OTHER PUBLICATIONS

Wohlin et al., Understanding the Sources of Software Defects: A Filtering Approach, 8th International Workshop on Program Comprehension (IWPC '00), p. 9, (Abstract), Jun. 10, 2000.

Pitt and McNiff, java, RMI: the Remote Method Inovocation Guide, Addison Wesley Professional, ISBN: 0201-70043-3, Section 3.5, 3 pages, Nov. 7, 2001.

* cited by examiner

702

| Option | Comment |
|---|---|
| MAN= | Set to 1 to allow the service to manage the screen saver settings. Set to 0 (default) to have screen saver settings managed by policies.<br>Note: The options below are only in effect if Man=1. |
| STI= | Sets the screen saver timeout. This may be overridden by the STO value. |
| STO= | Sets the screen saver timeout to be used when the computer is offline or when the current time falls within the range specified by the UOT value. |
| PTI= | Sets the screen power off timeout. This may be overridden by the PTO value. |
| PTO= | Sets the screen power off timeout to be used when the computer is offline or when the current time falls within the range specified by the UOT value. |
| UOT= | Time range to use the STO and PTO values instead of the STI and PTI values.<br>Note: This is intended for businesses that want a long timeout during the work day but a short timeout after hours. |
| SPW= | Set to 1 (default) to require user password entry to get out of screen saver. Set to 0 to disable the password security. |
| STB= | Set to 1 to enable the screen saver Control Panel tab. Set to 0 (default) to hide the screen saver tab. Enabling the tab is handy when testing the service, but otherwise is not necessary.<br>Note: With the tab enabled, any changes made via the GUI will be reverted back, to the settings specified for the service, on the next refresh cycle (default 1 minute). |
| SFN= | Sets the screen saver file name to be used. The default is logon.scr. This option is handy for specifying a business-specific screen saver file. |
| REF= | Sets how often, in minutes, that the service will check and, if necessary, refresh the screen saver settings. The default is 1 minute. Although the service uses very little CPU with the default 1 minute refresh, you may increase this value to further reduce CPU usage.<br>Note: If both STO and PTO values are unspecified then no refresh is performed and the REF value is ignored.<br>Note: The screen saver settings are only refreshed if the computer goes from online to offline (or vice versa) or a UOT time boundary has been crossed. |
| INS= | Set to 1 (default) to install the service. Set to 0 to uninstall the service.<br>Note: The /uninstall parameter may be used in place of INS=0. |

Figure 7a

SYSTEM AND METHOD FOR CONTROLLING A SCREEN SAVER

FIELD OF THE INVENTION

The present invention is directed to systems and methods for selectively controlling and customizing screen saver features and functionality.

BACKGROUND OF THE INVENTION

Screen savers continue to evolve. Originally developed to reduce the likelihood of damage to a computer screen caused by overexposure of images, screen savers have over the years become an integral part of virtually all computer systems. As any computer user knows, screen savers activate after a period of inactivity to display quirky or abstract images which can be deactivated by any user interaction with the computer, such as a keystroke or mouse movement, for example.

Recently, however, screen savers have taken on a more sophisticated function. Security concerns have led to the development of password-enabled screen savers that prevent unauthorized access to a user's computer unless a password is entered to deactivate the screen saver. Password-enabled screen savers are common in corporate settings where the terminals and computers of employees are routinely left unattended, making them easy targets for hackers and intruders. The problem is particularly acute when an employee is away from his or her desk for long periods of time, such as during lunch or off-hours, for example.

While current screen savers are effective for their intended purposes, they nonetheless suffer from several notable drawbacks. First, there is no known way for a user to customize screen saver parameters in a comprehensive and refined way. The Microsoft™ Windows™' screen saver, for example, allows a user to select the screen saver content/image and inactivity time (e.g., the time of inactivity required for a screen saver to activate), but it does not allow the user to globally customize other relevant parameters, such as, for example: (1) the particular dates or times when activation is enabled or disabled, (2) the type of computer or connectivity being utilized (e.g., laptop or desktop; online or offline, LAN or WAN, local or remote, etc.), or (3) whether a screen saver should be password-enabled. Current screen savers also do not allow a system administrator, for example, to particularly define screen saver operation.

Second, password-enabled screen savers can disrupt work flow and productivity in corporate settings by requiring a password to deactivate a screen saver. This creates problems for employees that may need to spend significant time away from their computers, but who also need immediate and prompt access without delay. Password-enabled screen savers are also problematic because they require users to memorize yet another password as part of their work environment.

These and other problems exist.

SUMMARY OF THE INVENTION

An object of the present invention is to overcome the aforementioned and other drawbacks existing in prior art systems and methods.

According to various embodiments of the present invention, systems and methods are provided that enable a user to control (e.g., enable and/or disable) and customize screen saver functionality and operation. For example, a user may control numerous screen saver parameters, including but not limited to: (1) activation parameters that dictate when a screen saver may be activated (e.g., activation only during evening or off hours); (2) timeframe parameters (e.g., 30 minute screen saver cycle during day, and 5 minute cycle during the evening or off-hours); (3) connectivity parameters, such as whether the computer is online or offline, or a desk top versus lap top, for example; and (4) whether a screen saver is password-enabled. Other screen saver parameters may be customized by individual users according to their individual needs and/or circumstances.

In some embodiments, a screen saver controller is provided that resides on a user's computer and enables the user to control a screen saver according to any number of parameters, including activation, timeframe, connectivity, and password configurations, for example. Other parameters and configurations are possible. For example, in a work environment, the controller may be programmed so that a screen saver will only appear during off-hours, weekends, or holidays, so as to not interfere with user interaction or productivity. Similarly, screen saver activation may be permitted according to specific timeframes or schedules. For example, activation may be set to occur after 5 minutes of inactivity during lunch hours or off-hours, but after 30 minutes of inactivity during working hours. Other timeframes and schedules are possible.

In some embodiments, screen saver activation and operation may depend on the particular connectivity of a computer or terminal. For example, the screen saver of an online connection may be configured to operate differently than that of an offline connection. Thus, an office computer terminal may activate a screen saver in a shorter period of time when connected to the office network, than when operating in an offline mode, for example. Such configurations may help guard against improper or unauthorized access to the office network. Similarly, a desktop computer or terminal may be configured to activate a screen saver differently than a laptop, for example. Other connectivity parameters and configurations are possible.

In various embodiments, a user may select whether a screen saver should be password-enabled (e.g., requires a password for deactivation). In some embodiments, whether a screen saver is password-enabled may be based on the date or time of activation. For example, screen savers that initiate during work hours may not be password-enabled, while those that activate during lunch and/or off-hours may require a password for deactivation.

According to various embodiments, the systems and methods described herein may enable a network operator, for example, to simultaneously control or administer screen saver functionality and operation at any number of network terminals. For example, a system administrator may interface with a screen saver controller to define screen saver functionality or operation for particular users or terminals, specifying for each user particular activation, timeframe, connectivity and password parameters and configurations, for example. Thus, user #1 may have different screen saver functionality and operation than user #2, for example. This way, the system administrator may control and customize screen saver functionality and operation according to the needs or circumstances of particular employees. Thus, if user #1 is out of town on business or on vacation for the next week, the system administrator may define user #1's screen saver to activate after 1 minute of inactivity or to always be activated, for example. In some embodiments, the system administrator may also be able to immediately activate/deactivate screen savers at all or select computers or terminals, such as in situations where a security concern arises or is later resolved, e.g., an intruder is reported in the building.

In some embodiments, the systems and methods described herein may maintain statistics on user and/or screen saver activity at a particular computer or terminal. For example, the number of times a screen saver is activated/deactivated at a particular computer or terminal may be maintained, as well as the number of times a user selects or customizes screen saver parameters or configurations. In some embodiments, the number of time a client station is logged on and/or off may also be monitored and maintained. Thus, a system administrator, for example, may monitor user, station and/or screen saver statistics to appreciate activity at a particular computer or terminal. If a particular user is deactivating his or her screen saver repeatedly throughout the day, a determination may be made that the screen saver parameter may need to be adjusted to increase the time for activation, or that the user is spending too much time away from the desk. Conversely, if a screen saver is never activated, then parameters may be adjusted to a lesser inactivity time, for example. Statistics for individual computers or terminals may be compared to gauge overall system usage and user interaction patters.

According to one embodiment of the invention, a system for controlling screen saver initiation and functionality is provided. The system may comprise at least one client station, each of the at least one client station having a screen saver module associated therewith; and a central control station in communication with each of the at least one client station over a network, the central control station having a screen saver control module for controlling each of the screen saver modules associated with the at least one client station.

In another embodiment of the invention, a method for coordinating screen saver functionality is provided. The system may comprise the steps of interfacing with at least one client station over a network; and transmitting at least one control signal to at least one client station over a network, the at least one control signal controlling at least one parameter of a screen saver module associated with the at least one client station.

In yet another embodiment of the invention, a computer-usable medium for coordinating screen saver initiation is provided. The computer-usable medium comprises code for interfacing with at least one client station over a network; and code for transmitting at least one control signal to at least one client station over a network, the at least one control signal controlling at least one parameter of a screen saver module associated with the at least one client station.

In still another embodiment of the invention, a system for coordinating screen saver initiation is provided. The system comprises at least one client station, each of the at least one client station having a screen saver module associated therewith; and a central control station in communication with each of the at least one client station over a network, the central control station having a screen saver control module for controlling each of the screen saver modules associated with the at least one client station, the screen saver control module comprising: a global control module for simultaneously controlling all of the screen saver modules associated with the at least one client station; a local control module for controlling the screen saver modules of select client stations; a temporal control module for controlling the screen saver modules according to at least one temporal parameter; a connectivity control module for controlling the screen saver modules according to at least one connectivity parameter; a content control module for controlling the screen saver modules according to at least one content parameter; and an interaction module for monitoring user and/or screen saver activity at each of the at least one client station, wherein the user and/or screen saver activity comprises at least one parameter relating to: (1) screen saver initiation, (2) user inactivity, or (3) user control of the screen saver module.

The accompanying drawings, which are incorporated in and constitute a part of this specification, illustrate various embodiments of the invention and, together with the description, serve to explain the principles of the invention.

BRIEF DESCRIPTION OF THE DRAWINGS

FIG. 7a illustrates exemplary parameters for controlling at least one screen saver module, according to one embodiment of the invention.

DETAILED DESCRIPTION OF THE INVENTION

Figure 1:
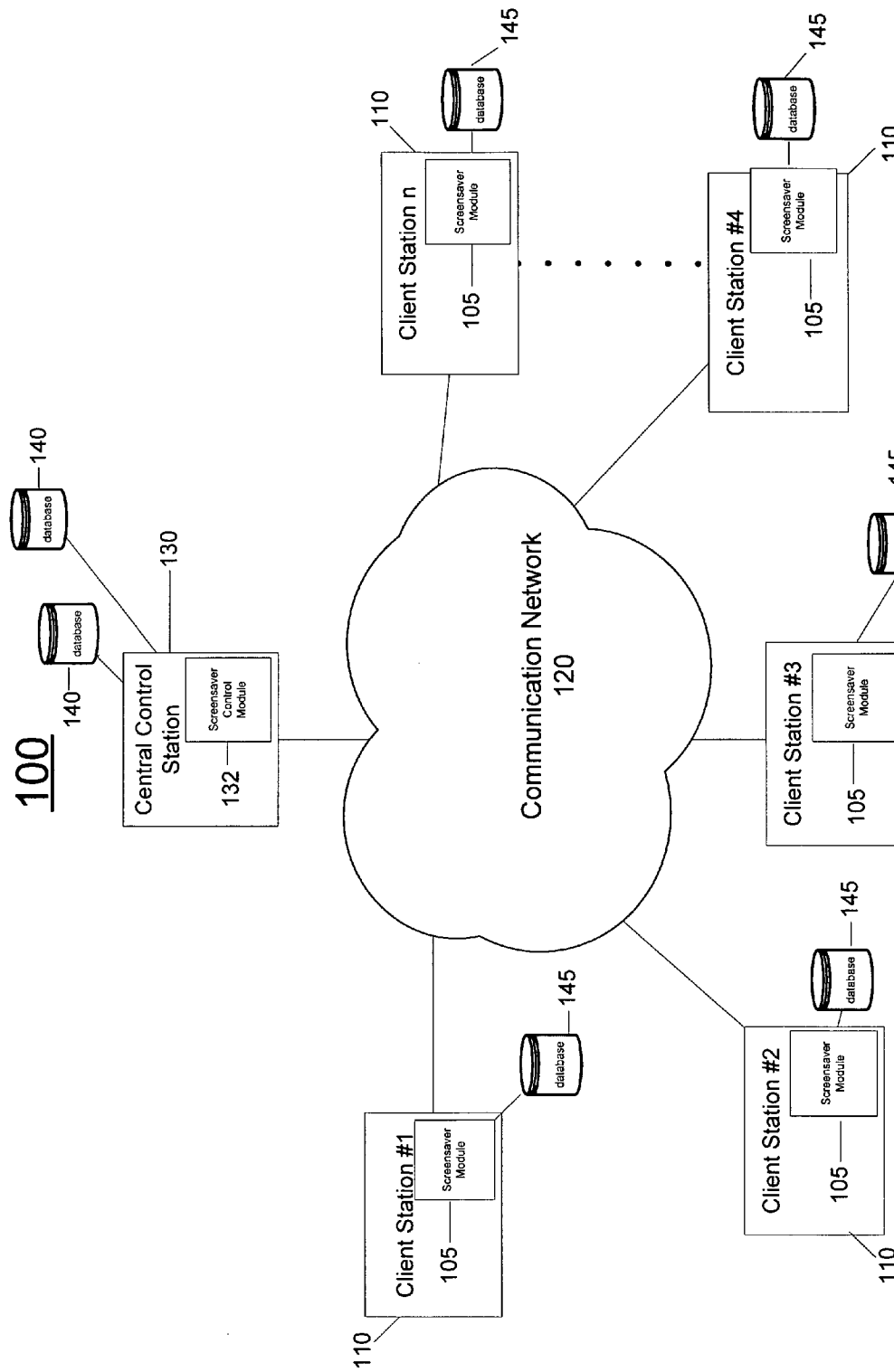
FIG. 1 is a block diagram illustrating a system for controlling at least one screen saver module, according to one embodiment of the invention.

Reference will now be made to illustrative embodiments of the invention(s) described herein, examples of which are illustrated in the accompanying drawings in which like reference characters refer to corresponding elements.

The present invention(s) are described in relation to various systems and methods for enabling a user to simultaneously control any number of screen savers associated with any number of client station. Nonetheless, the characteristics and parameters pertaining to the various embodiments of the systems and methods described herein may be applicable to the simultaneous control of any module, object, or application.

While the exemplary embodiments illustrated herein may show various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system, for example. Thus, it should be appreciated that the components of the various embodiments may be combined into one or more devices (or modules) or collocated on a particular node of a distributed network, such as a telecommunications network, for example. As will be appreciated from the following description, and for reasons of computational efficiency, the components of the various embodiments may be arranged at any location within a distributed network without affecting the operation of the respective system(s).

Various embodiments are disclosed herein that enable the coordination and administration of screen savers in a responsive and efficient manner. According to some embodiments, a software module programmed to operate according to a predetermined algorithm may enable a computer user, such as a system administrator, for example, to selectively control (e.g., enable and disable) multiple screen savers associated with multiple client stations. For example, a system administrator may selectively control screen saver functionality and operation at any number of network stations by defining screen saver parameters, including but not limited to: (1) activation parameters that dictate when a screen saver may be activated (e.g., activation only during evening or off-hours); (2) timeframe parameters (e.g., 30 minute screen saver cycle during day, and 5 minute cycle during the evening or off-hours); and (3) connectivity parameters, such as whether the computer is online or offline, or a desk top versus lap top, for example. Other screen saver parameters may be defined or customized.

In some embodiments, the systems and methods described herein may maintain statistics on screen saver activity at a particular computer or terminal. For example, the number of times a screen saver is activated/deactivated at a particular computer or terminal may be maintained, as well as the number of times a user selects or customizes screen saver parameters or configurations. Thus, a system administrator, for example, may monitor screen saver statistics to appreciate user activity at a particular computer or terminal. If a particular user is deactivating his or her screen saver repeatedly throughout the day, a determination may be made that the screen saver parameter may need to be adjusted to increase the time for activation, or that the user is spending too much time away from the desk. Statistics for individual computers or terminals may be compared to gauge overall system usage and user interaction patters.

According to various embodiments, the systems and methods described herein may enable any individual user to customize the functionality and operation of a screen saver module residing in the user's computer or terminal. In some embodiments, the user computer or terminal is a self-standing personal computer, for example, that is not associated with any network. The user may define, control or configure any of the parameters described herein.

FIG. 1 depicts an exemplary data processing environment or system 100 comprising one or more user or client stations 110, communications network 120, and one or more central control stations 130. As shown, client station 110 may connect to or communicate with central control station 130 through any number of communication networks, such as communication networks 120, for example. In some embodiments, client station 110 may include a screen saver module 105 that enables the user to control screen saver features and functionality on client station 110. Such features and functionality may comprise numerous screen saver parameters, including but not limited to: (1) activation parameters that dictate when a screen saver may be activated (e.g., activation only during evening or off hours); (2) timeframe parameters (e.g., 30 minute screen saver cycle during day, and 5 minute cycle during the evening or off-hours); and (3) connectivity parameters, such as whether the computer is online or offline, or a desk top versus lap top, for example. Other screen saver parameters may be customized by individual users according to their individual needs and/or circumstances.

According to various embodiments, information module 105 may host one or various modules that operate to perform the steps and functions of the claimed systems and methods, such as setting activation, time-frame or connectivity parameters. In some embodiments, screen saver module 105 may be part of the client station's operating system (OS), while in other embodiments it may comprise its own script, module or application. In either case, screen saver module may interface with central control station 130 and screen saver control module 132 over communication network 120 to enable a user of central control station 130 and/or screen saver control module 132, for example, to interact with or engage the features of screen saver module 105.

According to various embodiments, client station 110 may comprise a typical home or personal computer system where a user may interact with a network, such as the Internet, for example. Client station 110 may comprise or include, for instance, a personal or laptop computer. Client station 110 may include a microprocessor, a microcontroller or other general or special purpose device operating under programmed control. Client station 110 may also include a network-enabled appliance, a browser-equipped or other network-enabled cellular telephone, or another TCP/IP client or other device.

Client station 110 may be utilized by a user to browse a network, (e.g., the Internet) make online purchases, and/or simply conduct online searches, such as through a search engine or site, for example. User inactivity at client station 110 may result in screen saver features and functionality being initiated by screen saver module 105, for example. According to various embodiments, the systems and methods described may be used to administer, set, and/or control such screen saver feat, by remotely interacting with screen saver control module 132 at central control station 130, or locally interacting with screen saver module 105, for example. Data and information used by client station 110 or information control module 105 may be stored and maintained by database 145.

Central control station 130 may enable administration, control, and/or monitoring of screen saver module 105 on client station 110. In some embodiments, central control station 130 may comprise a terminal for an administrator of system 100. Such a terminal may be used, for example, to enable the administrator to control and oversee network operations, including but not limited to control and interaction with any number of the various screen saver modules 105 associated with client stations 110. In some embodiments, central control station 130 may provide updates of screen saver module 105, for example, that are downloaded to client station 110. Downloading of updates to information control module 105 and a client station 110, for example, may occur continuously, periodically, based on the occurrence of an event, upon a user's request, or according to a predetermined schedule or as needed.

For example, a system administrator interfacing with central control station 130 may control any of the various screen saver modules 105 according to any number of parameters, including station identification limitations (e.g., station #1, station #2 and/or station #3), time-based limitations (e.g., enable screen saver between 5 p.m. and 6 a.m. and disable between 6 a.m. and 5 p.m.) and connectivity configurations (e.g., LAN connections only), and password status (e.g., enabled/disabled). Other parameters are possible. For example, the controller may be programmed so that a screen saver will only appear during non-working hours/days, during lunch, etc. Similarly, screen savers may be permitted according to specific schedules, e.g., upon 5 minutes of inactivity during lunch hours, after 30 minutes of inactivity during work hours, immediately activated during lunch and after close of business. Other schedules are possible.

In some embodiments, screen savers may have different schedules depending on connectivity. For example, an online connection may be different than an offline connection. An office desktop computer might display screen savers differently or according to a different schedule and/or time-frame than a lap top, for example.

Central control station 130 may comprise a single server or engine. In some embodiments, central control station 130 may comprise a plurality of servers or engines, dedicated or otherwise, which may further host modules for performing desired system features and functionality. Central control station 130, for example, may download to client station 110 one or more modules that function to perform, control, administer, and/or direct the various screen saver features and functionality described herein, for example. Central control station 130 may include an administration module for an agent of central control station 130, for example, to input information related to such applications or modules, including but not limited to information or data used by screen saver control module 132 or screen saver module 105, and updates to client stations 110 and/or screen saver modules 105, for example. According to various embodiments, an agent of central control station 130 may interface with a graphical user interface (or GUI) to control screen saver modules 105 and to input necessary information and data.

Data and information maintained by central control station 130 may be stored and cataloged in database 140 which may comprise or interface with a searchable database. For example, databases 140 and/or 145 may store data or information about particular screen saver-related settings and parameters. For example, databases 140 and/or 145 may store data indicating that client station #1's screen saver should be enabled between 5 p.m. and 6 a.m., and that all laptops should have their screen saver enabled at all times, for example. Databases 140 and 145 may comprise, include or interface to a relational database. Other databases, such as a query format database, a Standard Query Language (SQL) format database, a storage area network (SAN), or another similar data storage device, query format, platform or resource may be used. Databases 140 and 145 may comprise a single database or a collection of databases, dedicated or otherwise. In one embodiment, databases 140 and 145 may store or cooperate with other databases to store contextual information described herein.

Communications network 120 may comprise any type of communication network such as one able to transmit and receive data or information relating to any number of trade transactions, such as product, good or service information and/or price information, for example. Communications network 120 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. Communications network 120 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 120 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 120 may comprise a satellite communications network, such as a direct broadcast communication system (DBS) having the requisite number of dishes, satellites and transmitter/receiver boxes, for example. Communications network 120 may also comprise a telephone communications network, such as the Public Switched Telephone Network (PSTN). In another embodiment, communication network 120 may comprise a Personal Branch Exchange (PBX), which may further connect to the PSTN.

FIGS. 2-5 illustrate exemplary modules that may be associated with screen saver module 105 and/or screen saver control module 132 for carrying out (or administering) the various functions and features of the embodiments described herein. In some embodiments, the modules may: (1) be accessed and/or updated by central control station 130 or client station 110, (2) control screen saver features and functionality associated with any of the clients stations 110, (3) define screen saver parameters for any of the screen saver modules associated with client stations 110, and/or (4) monitor user and/or screen saver activity at any of the client stations 110. Other capabilities are possible. While the modules may not be used in all embodiments to perform some or all of the functions of the present invention, they are nonetheless presented as possible embodiments.

Figure 2:
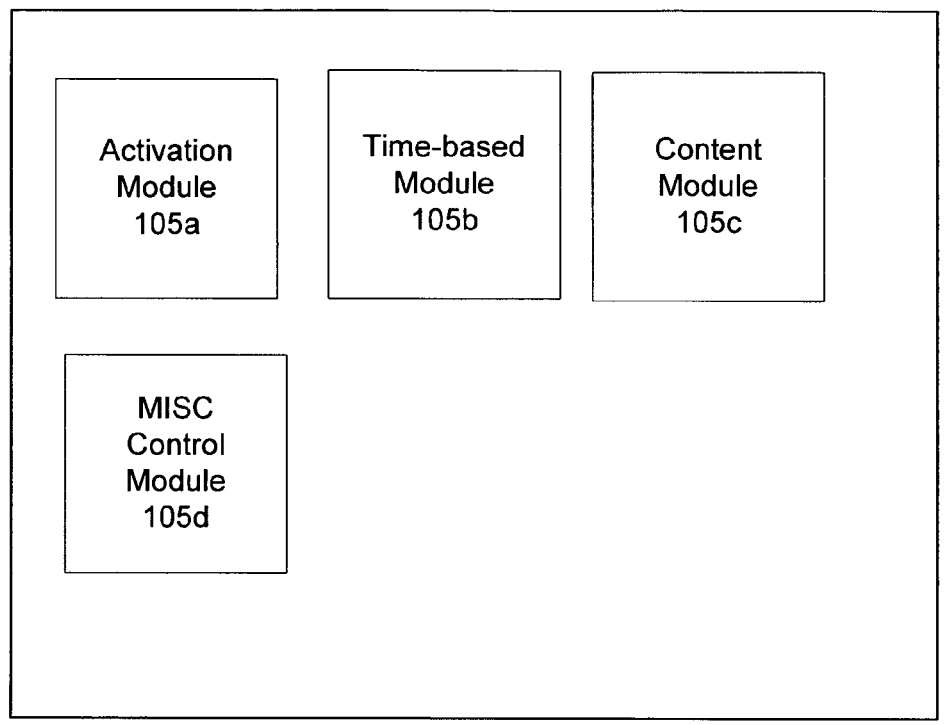
FIG. 2 is a block diagram illustrating exemplary modules associated with a screen saver module, according to one embodiment of the invention.

FIG. 2 illustrates various exemplary modules associated with screen saver module 105, according to some embodiments of the invention. In some embodiments, screen saver module 105 enables a user of a terminal or computer to selectively control various parameters of screen saver functionality and operation. In some embodiments, the various modules may be accessed through any number of graphical user interface(s) that enable a user to provide and receive data or information. As shown, the following modules may be provided: (1) activation module 105a, (2) time-based module 105b, (3) content module 105c, and miscellaneous module(s) 105d:

Activation module 105a may, in some embodiments, enable a user of client station 110 or screen saver module 105 to selectively control when a screen saver activates and/or deactivates. A user may determine that the screen saver should only activate during certain specified dates or times, or that the screen should always or never be activated. For example, a user may schedule a screen saver to always be activated during off hours, or that it never be activated during work hours. Other configurations are possible.

Time-based module 105b may, in some embodiments, enable a user of client station 110 or screen saver module 105 to select particular time parameters defining how a screen saver may activate. For example, upon using activation module 105a to schedule a screen saver never activate during working hours, a user may further or qualify that selection using time-based module 105b so that during the lunch (e.g., 12 pm to 1 pm) the screen saver activates after 1 minute of inactivity, while any other time (e.g., 8 am-12 pm and 1 pm-5 pm) activation should occur after 15 minutes of inactivity. Other configurations are possible.

Content module 105c may, in some embodiments, enable a user to specify particular screen saver(s) to display according to the activation and time-based parameters selected. For example, a user may specify that a particular screen saver appear during lunch, but that no screen saver image (e.g., a blank screen) should appear during off-hours, for example. Other configurations are possible.

Password module 105d may, in some embodiments, enable a user to specify when or which screen saver(s) should be password-enabled. In some embodiments, whether a screen saver is password-enabled may depend on the date or time of activation, for example. Miscellaneous control module 105d may, in some embodiments, enable the user to select additional parameters associated with screen saver functionality and operation.

Figure 3:
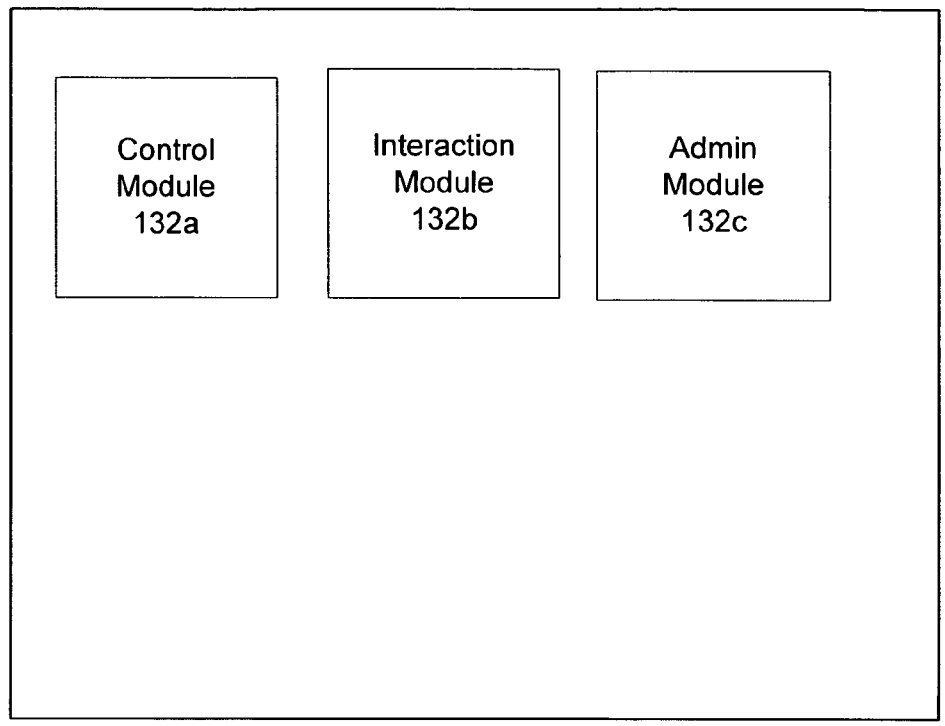
FIG. 3 is a block diagram illustrating exemplary modules associated with a screen saver control module, according to one embodiment of the invention.

FIG. 3 illustrates various exemplary modules associated with screen saver control module 132 of central control station 132, according to one embodiment of the invention. In some embodiments, screen saver control module 132 may be used by a system administrator, for example, to selectively control and/or administer the various screen saver modules 105 of client stations 110. As shown, the following modules may be provided: (1) control module 132a, (2) interaction module 132b, and (3) administration module 132c:

Control module 132a may, in some embodiments, enable a system administrator, for example, to control any of the screen saver modules 105 associated with the client stations 110. In some embodiments, control module 132a may present the system administrator with a graphical user interface (GUI) that presents and receives from the administrator data or information relating to control of the modules, such as, for example, values for various screen saver parameters (e.g., activation, timeframes, and connectivity parameters) (See FIG. 4 for a more detailed description of control module 132a).

Interaction module 132b may, in some embodiments, enable a system administer, for example, to interact with or monitor screen saver activity at any of the client stations 110. For example, the number of times a screen saver is activated or deactivated at a particular computer or terminal may be maintained, as well as the number of times a user selects or customizes screen saver parameters or configurations. In some embodiments, the systems and methods described herein may maintain statistics on screen saver activity at a particular computer or terminal. Thus, a system administrator, for example, may monitor screen saver statistics to appreciate user activity at a particular computer or terminal. If a particular user is deactivating his or her screen saver repeatedly throughout the day, a determination may be made that the screen saver parameter may need to be adjusted to increase the time for activation, or that the user is spending too much time away from the desk. Statistics for individual computers or terminals may be compared to gauge overall system usage and user interaction patters. (See FIG. 5 for a more detailed description of control module 132b).

Administration module 132c may, in some embodiments, enable a systems administrator, for example, to input information related to such applications or modules, including but not limited to information or data used by screen saver control module 132 or screen saver module 105, and updates to client stations 110 and/or screen saver modules 105, for example. According to various embodiments, an agent of central control station 130 may interface with a graphical user interface (or GUI) to control screen saver modules 105 and to input necessary information and data.

Figure 4:
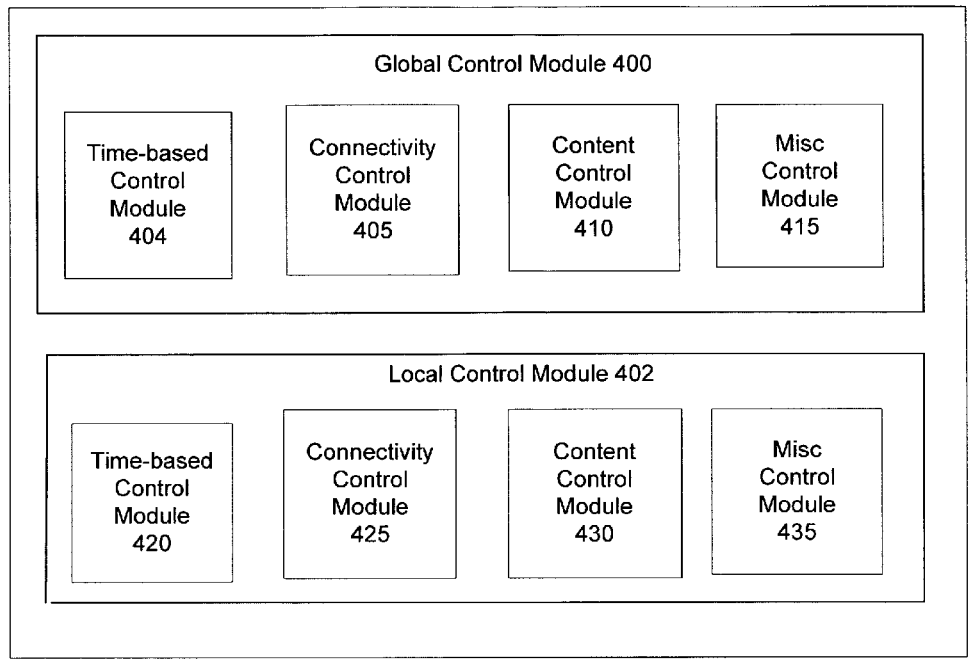
FIG. 4 is a block diagram illustrating additional exemplary modules associated with a screen saver control module, according to one embodiment of the invention.

FIG. 4 illustrates one embodiment of a control module 132a, according to one embodiment of the invention. As shown, control module 132a may comprise a global control module 400 that enables the system administrator to control all client stations on the network. In some embodiments, global control module 400 may comprise a time-based control module 404, a connectivity control module 405, a content control module 410, and a miscellaneous control module 415. Control module 132a may also include a local control module 402 that enables the system administrator to control select client stations on the network. In some embodiments, local control module 402 may likewise comprise a time-based control module 420, a connectivity control module 425, a content control module 430, and a miscellaneous control module 435. A systems administrator may decide to control all client stations, in which case global control module 400 would perform the requested processes, or to control only select stations, in which case local control module 425 would be initiated.

Time-based control modules 404 and 420 may, in some embodiments, operate to control any number of activation and time-based parameters of screen saver modules 105 associated with all or select client stations. In some embodiments, for example, time-based control modules may allow a systems administrator to set activation parameters that dictate when a screen saver may be activated (e.g., activation only during evening or off hours), as well as determine timeframe parameters that dictate how a screen is to activate (e.g., 30 minute screen saver cycle during day, and 5 minute cycle during the evening or off-hours).

Connectivity control modules 405 and 425 may, in some embodiments, operate to control any number of connectivity parameters of screen saver modules 105 associated with all or select client stations. In some embodiments, whether the computer is online or offline, a desk top versus lap top, and/or whether the connection is a LAN or WAN network, for example. Other connectivity parameters are possible.

Content control modules 410 and 430 may, in some embodiments, operate to control the particular screen saver(s) to be displayed on each of screen saver modules 105 associated with all or select client stations. In some embodiments, the particular screen saver displayed may vary depending on day or time, for example. Miscellaneous control modules 415 and 435 may operate to globally or locally control any other parameters associated with screen saver modules 105.

Figure 5:
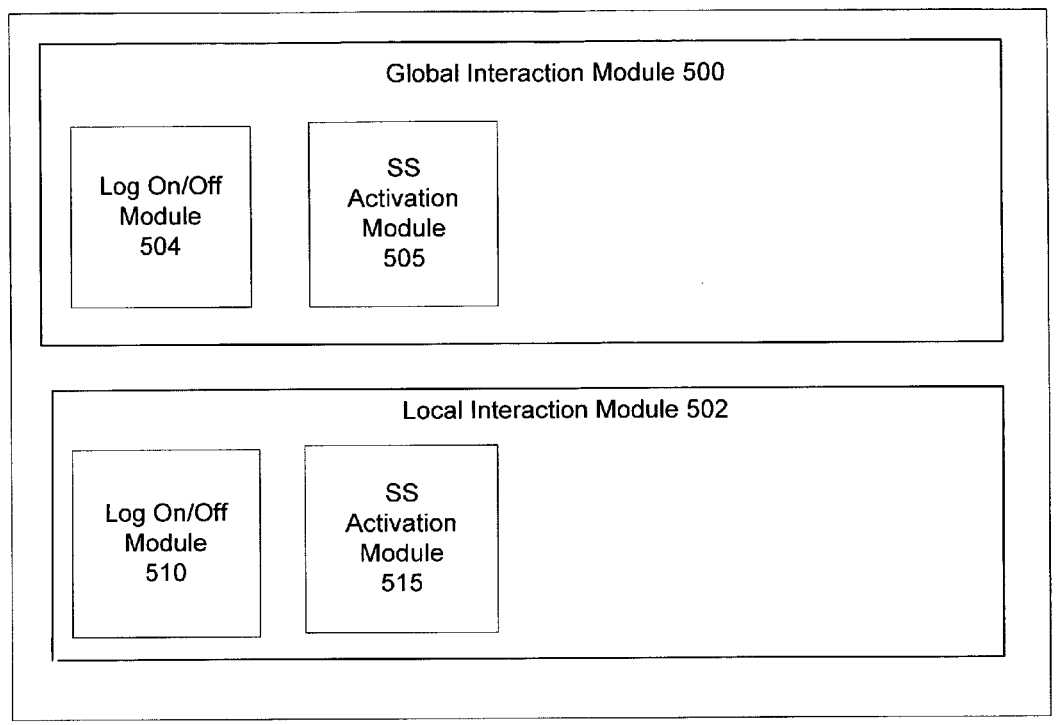
FIG. 5 is a block diagram illustrating exemplary modules associated with an interaction module, according to one embodiment of the invention.

FIG. 5 illustrates one embodiment of an interaction module 132b, according to one embodiment of the invention. As shown, interaction module 132b may comprise a global interaction module 500 that enables the system administrator to monitor or interact with all client stations on the network. In some embodiments, global interaction module 500 may comprise a log on/off module 504, and a screen saver (SS) activation module 505. Interaction module 132b may also include a local interaction module 502 that enables the system administrator to monitor or interact with select client stations on the network. In some embodiments, local control module 502 may likewise comprise a log on/off module 510, and a screen saver (SS) activation module 515. A systems administrator may decide to monitor or interact with all client stations, in which case global interaction module 500 would perform the requested processes, or to monitor or interact with select stations, in which case local interaction module 502 would be initiated.

Log on/off modules 504 and 510 may, in some embodiments, operate to monitor user interaction with all or select client stations. For example, log on/off modules 504 and 510 may monitor the number of times a particular client station is logged on and/or off. In various embodiments, log on/off modules 504 and 510 may maintain statistics for each client station and may also compare activity amongst client stations to determine overall system operation and identify possible discrepancies.

Screen saver (SS) activation/deactivation modules 505 and 515 may, in some embodiments, monitor user interaction with all or select client stations. For example, SS activation modules 504 and 510 may monitor the number of times a particular client station activates and/or deactivates a screen saver. In various embodiments, SS activation/deactivation modules 504 and 510 may maintain statistics for each client station and may also compare screen saver activity amongst client stations to determine overall system operation and identify possible discrepancies.

Figure 6:
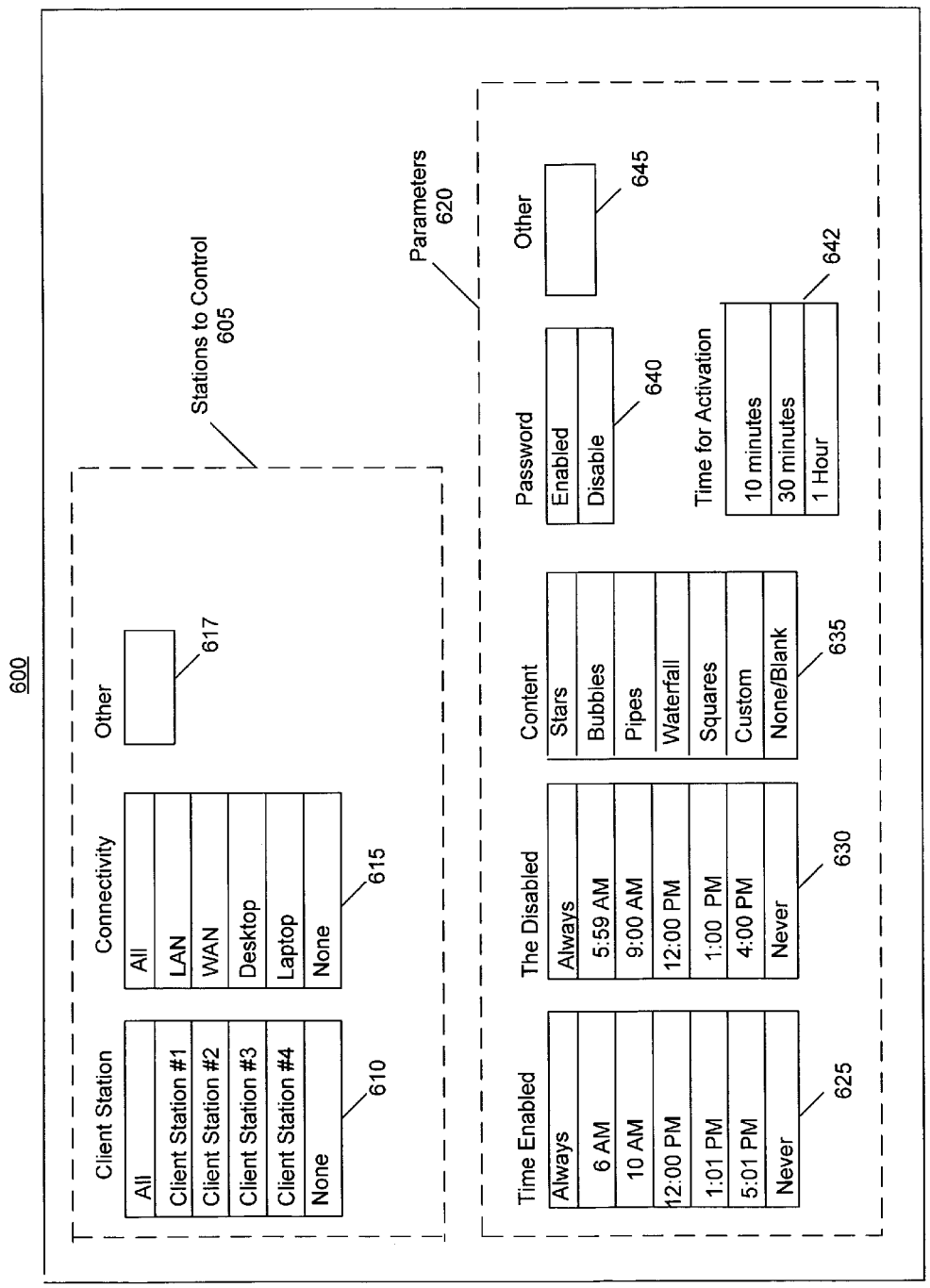
FIG. 6 illustrates an interface for controlling at least one screen saver module, according to one embodiment of the invention.

FIG. 6 illustrates one embodiment of an exemplary interface for controlling and/or administering screen saver modules associated with any number of client stations. In some embodiments, interface 600 may comprise a graphical user interface associated with screen saver control module 132 that a system administrator may interact with to selectively control and/or administer the screen saver modules 105 associated with client stations 110. As shown, interface 600 may comprise stations to control menu 605 which may comprise a client station menu 610, connectivity menu 615 and other menu(s) 617. Interface 600 may also comprise a parameters menu 620 which may comprise a time enabled menu 625, a time disabled menu 630, a content menu 635, a password menu 640, a time for activation menu 642, and other menu(s) 645. In some embodiments, each of the menus may comprise a pull down menu that allows the system administrator to select at least one parameter for each menu.

Stations to control interface 605 may comprise a list of menus that enable the system administrator to determine which computers, stations, or terminals to control or administer. Client station menu 610, for example, may comprise a listing of all terminals or stations connected to the network which the system administrator may control or administrator. Connectivity menu 615 may comprise a listing of various forms of connectivity, such as all connections, LAN, WAN, desktop, laptop, or none, for example. In some embodiments, connectivity may enable selection of offline versus online connections, or local or remote locations, for example. Other connectivity parameters are possible. Other menu(s) 617 may comprise a menu of any other definable feature or attribute related to which stations the system administrator seeks to control.

Parameters interface 620 may comprise a list of menus that enable the system administrator to determine how to control or administer select computers, stations, or terminals defined by stations to control interface 605, for example. Time enabled menu 625, for example, may comprise a listing of various times when select computers, stations, or terminals are enabled to activate screen saver features or functionality. In some embodiments, values may comprise specific times or terms such as always or never, for example. Time disabled menu 630 may likewise comprise a listing of various times when select computers, stations or terminals are disabled from screen saver activation.

Content menu 635 may comprise a listing of particular screen savers that may be displayed on the screen saver modules 105 associated with some or all of the client stations 110. For example, content menu 635 may comprise the names of various screen savers, such as stars, bubbles, etc. In some embodiments, the screen saver may comprise a custom image, or lack an image altogether (e.g., a blank screen). Other screen saver content/images may be provided.

Password menu 640 may allow the selection of a password-enabled/disabled screen saver. In some embodiments, whether a screen saver is password-enabled may be based on the date or time of activation. For example, screen savers that initiate during work hours may not be password-enabled, while those that active during lunch and/or off-hours may require a password for deactivation.

Time for activation menu 642 may allow the selection of particular time periods for activation of a screen saver. In some embodiments, the time for activation may be based on the date or time of activation. For example, screen savers that activate during work hours may do so upon 30 minutes of inactivity, while those that activate during lunch and/or off-hours may do so immediately or after 1 minute of inactivity, for example.

Other menus 645 may comprise a menu of any other definable feature or attribute related to screen saver parameter(s) the system administrator seeks to control.

In some embodiments, a system administrator may select particular parameters for each of the various menus to achieve particular configurations that allow the selective control and administration of screen saver modules, for example.

Exemplary configurations using interface 600 are shown below:

I. A Typical Office or Work Environment
A. Configuration #1 (Morning)
Client Station: All
Connectivity: LAN and WAN
Time Enabled: 6 AM
Time Disabled: 12 PM
Content: Squares
Password: Disabled
Time for Activation: 1 hour
B. Configuration #2 (Lunch)
Client Station: All
Connectivity: LAN and WAN
Time Enabled: 12 PM
Time Disabled: 1 PM
Content: Squares
Password: Enabled
Time for Activation: 5 minutes
C. Configuration #3 (Afternoon)
Client Station: All
Connectivity: LAN and WAN
Time Enabled: 1 PM
Time Disabled: 5 PM
Content: Squares
Password: Disabled
Time for Activation: 30 minutes
D. Configuration #4 (Off-Hours)
Client Station: All
Connectivity: LAN and WAN
Time Enabled: 5 PM
Time Disabled: 6 AM Content: None
Password: Enabled
Time for Activation: Always On The preceding configurations (A, B, C, and D) are exemplary of a set of configurations that may be used in a typical office or work environment. As configured, the system will operate in four distinct stages: A-morning stage, B-lunch stage, C-afternoon stage, and D-off hours stage. The morning stage starts at 6 am and applies to all stations on either a LAN or WAN network. During the morning stage, a screen saver called "squares" will activate at a client station after 15 minutes of inactivity at that station. The screen saver may be deactivated by a user without having to provide a password.

The lunch stage runs from 12 pm to 1 pm and also applies to all stations on either a LAN or WAN network. During the lunch stage, the "squares" screen saver will be activated upon 5 minutes of inactivity. Unlike the morning stage, however, a password will be required for activation. The afternoon stage is identical to the morning stage, except that it runs from 1 pm to 5 pm and a screen saver will be activated after 30 minutes of inactivity. The off-hours stage is similar to the lunch stage, except that it runs from 5 pm to 6 am, a screen saver is always on (e.g., it immediately activates at 5 pm), and no image is displayed (e.g., a blank screen appears).

Figure 7:
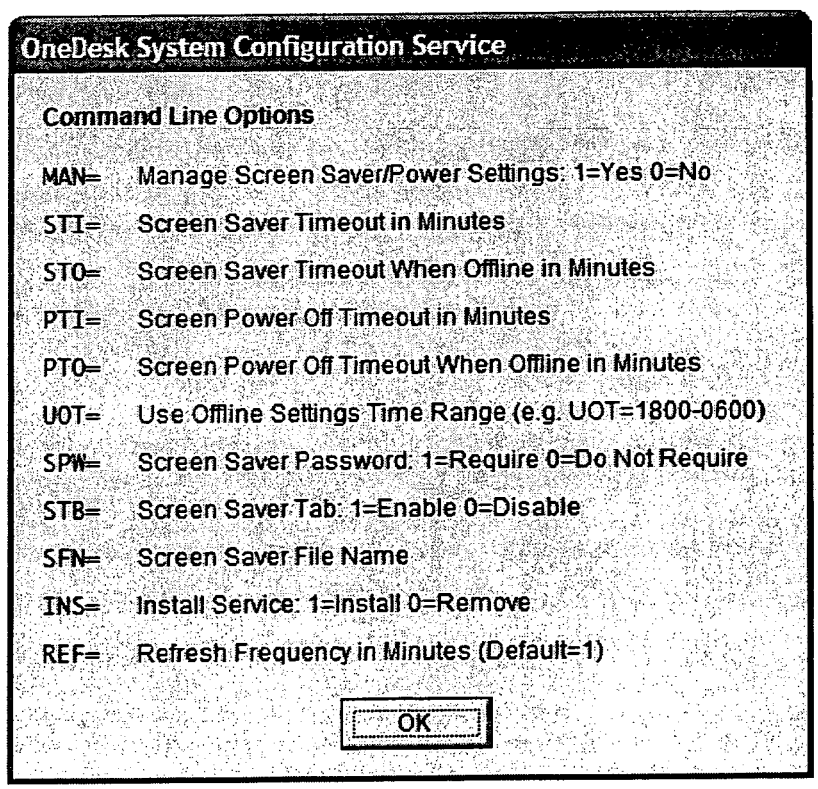
FIG. 7 illustrates an exemplary script for controlling at least one screen saver module, according to one embodiment of the invention.

FIG. 7 illustrates one embodiment of an exemplary script 700 that may perform some of the features and functionality described herein. As shown, script 700 may comprise various command line options that specifically carry out many of the features and functionality described herein. FIG. 7a provides a legend that defines each of the command line variables of script 700. Other scripts may of course be used.

Exemplary methods that may be performed by the various systems described above will now be discussed. In some embodiments, the methods described herein may be performed by system 100, and more specifically screen saver modules 105 and/or screen saver control modules 132.

Figure 8:
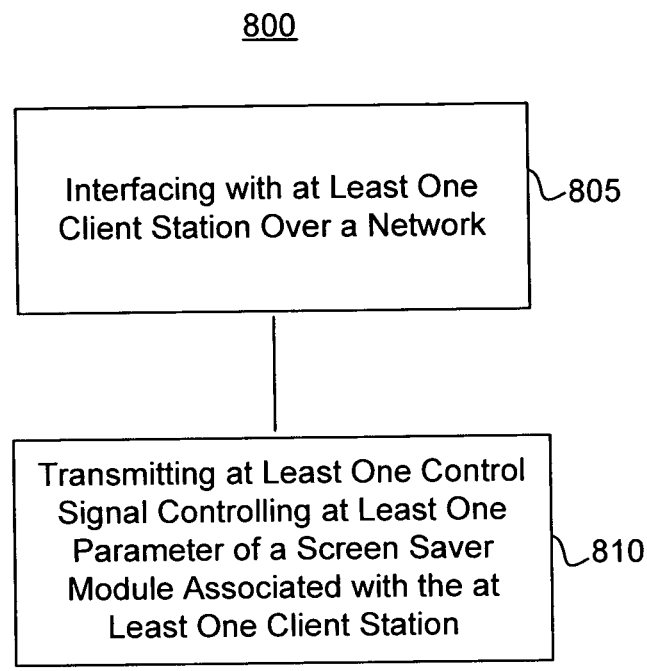
FIG. 8 illustrates a method 800 for controlling at least one screen saver module, according to one embodiment of the invention.

FIG. 8 illustrates one embodiment of a method 800 for controlling and/or administering at least one screen saver module. At step 805, a user may interface with at least one client station over a network. In some embodiments, the user may comprise a system administrator. At step 810, the user may transmit at least one control signal controlling at least one parameter of a screen saver module associated with at least one client station. In some embodiments, the at least one parameter comprises an activation, timeframe and/or connectivity parameter.

Figure 9:
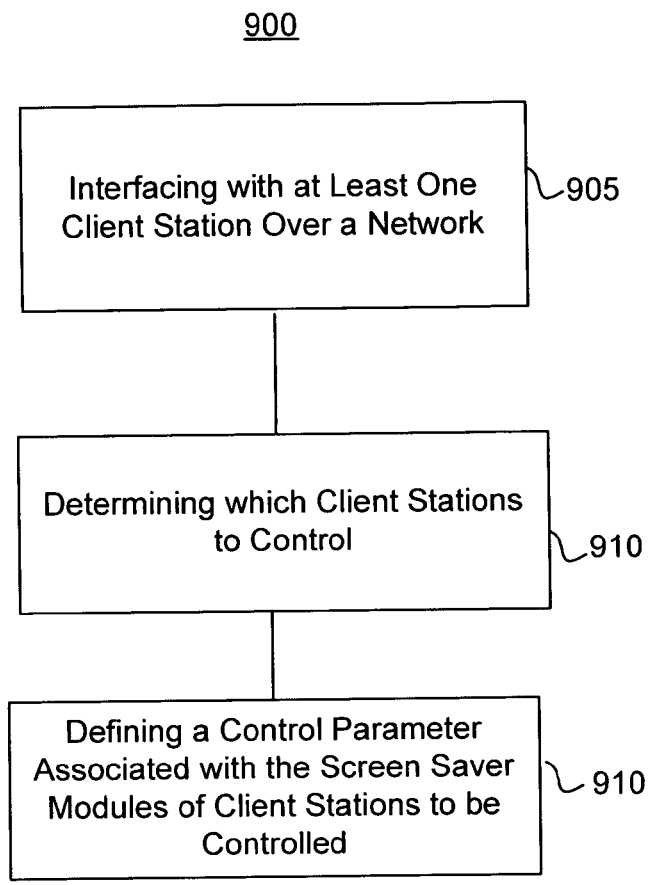
FIG. 9 illustrates a method 900 for controlling at least one screen saver module, according to one embodiment of the invention.

FIG. 9 illustrates one embodiment of a method 900 for controlling and/or administering at least one screen saver module. At step 905, a user may interface with at least one client station over a network. At step 910, the user may determine which particular client station to control. In some embodiments, the user may comprise a system administrator and the client stations may comprise the computers or terminals of various employees, for example. At step 915, the user may define at least one control parameter associated with the screen saver module(s) of the client station(s) to be controlled. In some embodiments, the at least one control parameter may comprise an activation, timeframe and/or connectivity parameter of the screen saver module(s).

Figure 10:
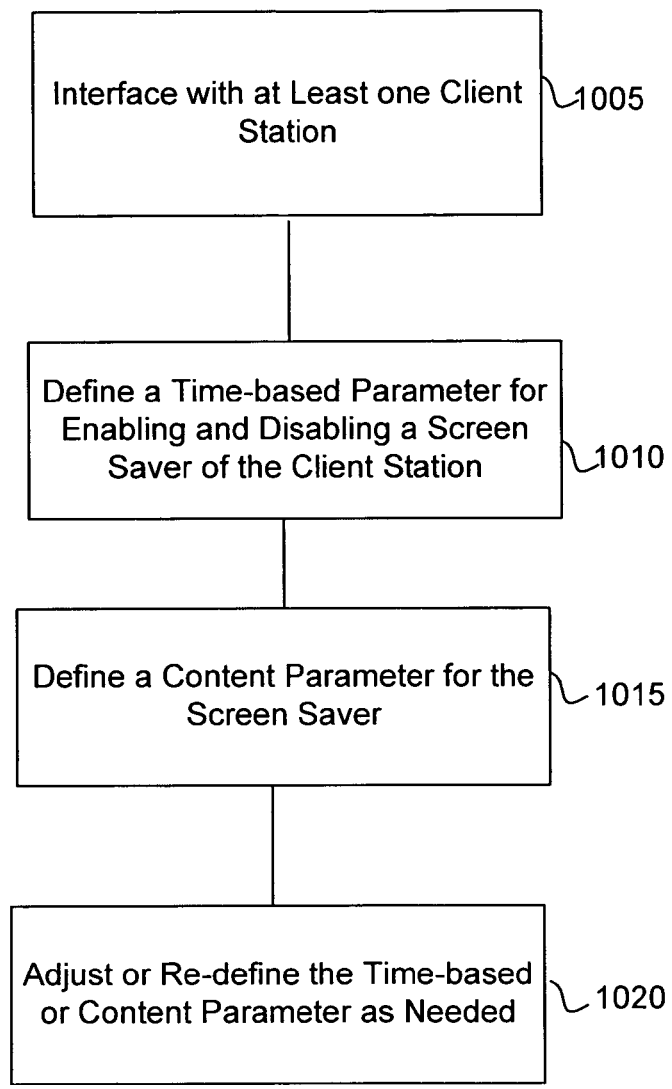
FIG. 10 illustrates a method 1000 for controlling at least one screen saver module, according to one embodiment of the invention.

FIG. 10 illustrates one embodiment of a method 1000 for controlling and/or administering at least one screen saver module. At step 1005, a user may interface with at least one client station. At step 1010, the user may define a time-based parameter for enabling or disabling a screen saver module of the client station. In some embodiments, the time-based parameter may define when the screen saver may activate and/or when the screen saver may deactivate. In various embodiments, the time-based parameter may define a time for activation of the screen saver (e.g., time of inactivity), which may vary as necessary. For example, during working hours the time of inactivity may be 30 minutes, whereas during off-hours or lunch the time may be 1 minute, for example. At step 1015, the user may define a content parameter for the screen saver. In some embodiments, the content parameter may comprise the particular screen saver to be shown upon activation. At step 1020, the user may re-define the time-based and/or the content parameter as necessary.

Figure 11:
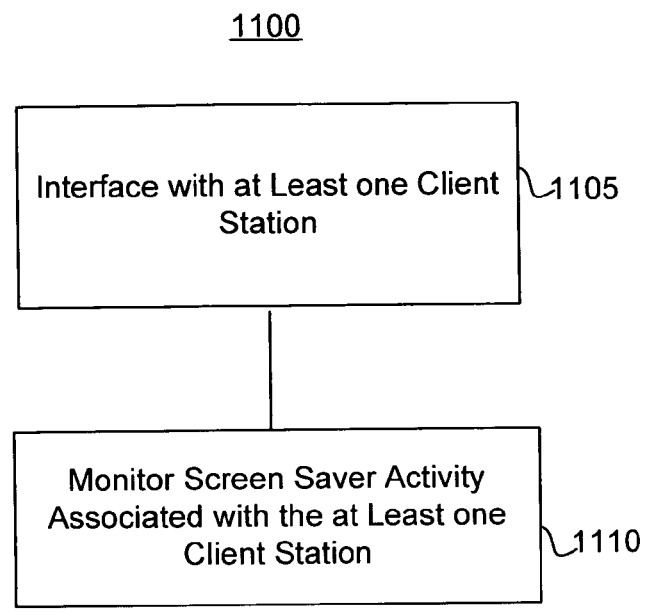
FIG. 11 illustrates a method 1100 for controlling at least one screen saver module, according to one embodiment of the invention.

FIG. 11 illustrates one embodiment of a method 1100 for controlling and/or administering at least one screen saver module. At step 1105, a user may interface with at least one client station. At step 1110, the user may monitor screen saver activity associated with the at least one client station. In some embodiments, the screen saver activity may comprise the number of times a screen saver is activated or deactivated within a period of time, for example. For example, a system administrator may monitor screen saver activation at a particular station or terminal and note that the screen saver activated thirty (30) times during working hours. The system administrator may then redefine the time of activation parameter for that station or terminal so that the activation occurs less frequently.

Figure 12:
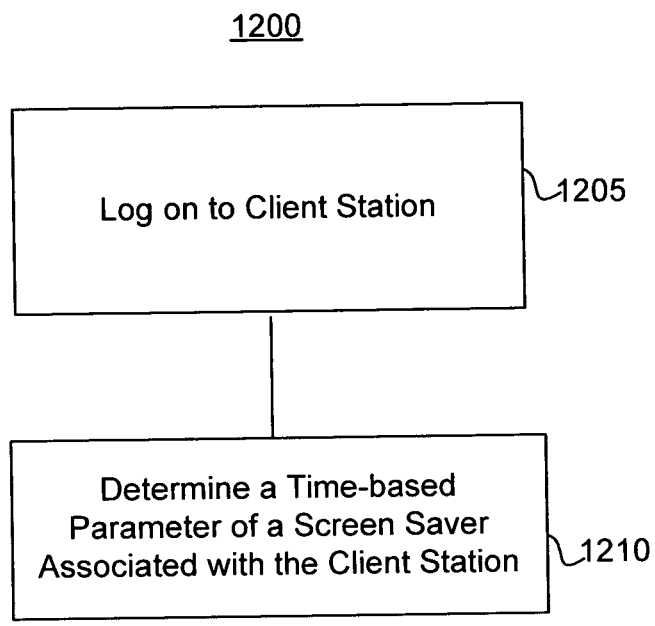
FIG. 12 illustrates a method 1200 for controlling at least one screen saver module, according to one embodiment of the invention.

FIG. 12 illustrates one embodiment of a method 1200 for controlling and/or administering a screen saver module. At step 1205, a user may log onto his or her personal computer. At step 1210, the user may determine a time-based parameter of a screen saver associated with his or her computer. In some embodiments, the user may determine any of an activation, timeframe or connectivity parameter associated with his or her computer.

The various embodiments of the systems and methods described and claimed herein provide numerous advantages. For example, the systems and methods permit a user to better (1) ability to have a time-based screen saver that is active during prescribed timeframes and inactive during others; (2) ability to control other parameters of screen saver based on timeframes (e.g., 30 minute screen saver cycle during day, and 5 minute cycle during evening); and (3) ability to vary other screen saver functionalities based on various control parameters, such as whether the computer is on-network or off-network, a desk top versus lap top, etc.; and (4) more globally, ability for individual users to customize their screen saver performance by setting control parameters according to the needs of each user and his/her work circumstances.

Other embodiments, uses and advantages of the present invention will be apparent to those skilled in the art from consideration of the specification and practice of the invention disclosed herein. The specification and examples should be considered exemplary only.

The invention claimed is:

1. A system for controlling screen saver activation and functionality, comprising:
   at least one client station, each of the at least one client station comprising at least one processor and storage medium implementing a screen saver module associated therewith, wherein the screen saver module is operable to at least enable/disable or activate/deactivate a screen saver according to one or more parameters that vary according to a pre-set schedule specifying when a screen saver is to be enabled or its activation behavior is to be changed, wherein the pre-set schedule is determined based on expected user activities on said at least one client station during one or more particular days and times; and a central control station in communication with each of the at least one client station over a network, the central control station having a screen saver control module operable to transmit at least one control signal over the network, the at least one control signal including at least part of the one or more parameters to control one or more screen saver modules associated with the at least one client station;

the screen saver control module further comprising:
a global control module for simultaneously controlling all of the screen saver modules associated with the at least one client station;
a local control module for controlling the screen saver modules of select client stations; and
at least one of:
a temporal control module for defining when the screen saver modules enable/disable or activate/deactivate screen savers according to at least one temporal parameter, the at least one temporal parameter comprising the pre-set schedule specifying when a screen saver is to be enabled or its activation behavior is to be changed, and
a connectivity control module for controlling the screen saver modules according to at least one connectivity parameter that changes activation behavior of the screen saver based at least on whether the at least one client station is connected to a network.

2. The system of claim 1 wherein the pre-set schedule causes the screen saver module associated with the at least one client station to disable the screen saver so that it will not activate during a predetermined period of work hours on a work day.

3. The system of claim 1 wherein the pre-set schedule further causes the screen saver to activate after a first period of inactivity during a first particular day or time and causes the screen saver to activate after a second period of inactivity during a second particular day or time, and wherein the first period is substantially different from the second period.

4. The system of claim 1 wherein the screen saver module further comprises an interaction module for monitoring user and/or screen saver activity at the at least one client station.

5. The system of claim 4 wherein at least one of the one or more parameters is generated based on the monitored user and/or screen saver activity relating to frequency of screen saver activation and/or user control of the screen saver module.

6. A method for coordinating screen saver functionality, comprising:
interfacing with at least one client station over a network;
generating one or more parameters that vary according to a pre-set schedule specifying when a screen saver is to be enabled or its activation behavior is to be changed, wherein the pre-set schedule is determined based on expected user activities on said at least one client station during one or more particular days and times; and
transmitting at least one control signal to at least one client station over a network, the at least one control signal including the one or more parameters and causing a screen saver module associated with the at least one client station to enable/disable or activate/deactivate a screen saver according to at least one of the one or more parameters;

the one or more parameters comprising:
at least one global control parameter for simultaneously controlling all of the screen saver modules associated with the at least one client station
at least one local control parameter for controlling the screen saver modules of select client stations;
at least one of:
a temporal control parameter comprising a pre-set schedule for specifying when a screen saver is to be enabled or its activation behavior is to be changed, and
a connectivity control parameter that changes activation behavior of the screen saver based at least on whether the at least one client station is connected to a network; and
at least one content control parameter for controlling a display content of the screen saver.

7. The method of claim 6 wherein the pre-set schedule causes the screen saver module associated with the at least one client station to disable the screen saver so that it will not activate during a predetermined period of work hours on a work day.

8. The method of claim 6 wherein the at least one control signal comprises a signal controlling or defining a period of inactivity required for the screen saver module to activate the screen saver.

9. The method of claim 8 wherein the period of inactivity varies based at least in part on the pre-set schedule.

10. The method of claim 9 wherein a first period of inactivity applies to a first time period and a second period of inactivity applies to a second time period.

11. The method of claim 10 wherein the first time period comprises work hours and the second time period comprises off-hours.

12. The method of claim 6 further comprising the step of monitoring a screen saver module associated with at least one client station.

13. The method of claim 12 wherein the monitoring step comprises monitoring the number of times the screen saver module associated with at least one client station has activated or deactivated a screen saver.

14. A data storage device having a non-transitory computer-usable storage medium with computer executable code for coordinating screen saver initiation, comprising:
computer executable code embodied on a non-transitory computer-usable storage medium for interfacing with at least one client station over a network;
computer executable code embodied on the non-transitory computer usable storage medium for generating one or more screen saver parameters that vary according to a pre-set schedule specifying when a screen saver is to be enabled or its activation behavior is to be changed, wherein the pre-set schedule is determined based on expected user activities on said at least one client station during one or more particular days and times; and
computer executable code embodied on the non-transitory computer-usable storage medium for transmitting at least one control signal to at least one client station over a network, the at least one control signal including the one or more screen saver parameters and causing a screen saver module associated with the at least one client station to enable/disable or activate/deactivate a screen saver according to at least one of the one or more screen saver parameters;

the one or more parameters comprising:
at least one global control parameter for simultaneously controlling all of the screen saver modules associated with the at least one client station
at least one local control parameter for controlling the screen saver modules of select client stations;

at least one of:
- a temporal control parameter comprising a pre-set schedule for specifying when a screen saver is to be enabled or its activation behavior is to be changed, and
- a connectivity control parameter that changes activation behavior of the screen saver based at least on whether the at least one client station is connected to a network; and
- at least one content control parameter for controlling a display content of the screen saver.

15. The data storage device of claim 14 further comprising computer executable code embodied on the non-transitory computer-usable storage medium for defining or controlling a period of inactivity required for the screen saver module to activate the screen saver, wherein the period of inactivity varies at least in part based on the pre-set schedule.

16. The data storage device of claim 14 further comprising computer executable code embodied on the non-transitory computer-usable storage medium for enabling or disabling password protection of the screen saver module associated with the at least one client station based at least in part on the pre-set schedule.

17. A system for coordinating screen saver activation, comprising:
- at least one client station, each of the at least one client station having a screen saver module associated therewith, wherein the screen saver module is operable to at least activate or deactivate a screen saver; and
- a central control station in communication with each of the at least one client station over a network, the central control station having a screen saver control module for controlling each of the screen saver modules associated with the at least one client station, the screen saver control module comprising:
  - a global control module for simultaneously controlling all of the screen saver modules associated with the at least one client station;
  - a local control module for controlling the screen saver modules of select client stations;
  - a temporal control module for defining when the screen saver modules enable/disable or activate/deactivate screen savers according to at least one temporal parameter, the at least one temporal parameter comprising a pre-set schedule specifying when a screen saver is to be enabled or its activation behavior is to be changed, wherein the pre-set schedule is determined based on expected user activities on said at least one client station during one or more particular days and times;
  - a connectivity control module for controlling the screen saver modules according to at least one connectivity parameter that changes activation behavior of the screen saver based at least on whether the at least one client station is connected to a network;
  - a content control module for controlling the screen saver modules according to at least one content parameter that determines a display content of the screen saver; and
  - an interaction module for monitoring use and/or screen saver activity at each of the at least one client station, wherein the user and/or screen saver activity comprises at least one parameter relating to: (1) screen saver activation, (2) user inactivity, or (3) user control of the screen saver module.

18. A system for monitoring screen saver activation, comprising:
- at least one client station, each of the at least one client station having a screen saver module associated therewith, wherein the screen saver module is operable receive a control signal including one or more parameters that vary according to a pre-set schedule specifying when a screen saver is to be enabled or its activation behavior is to be changed, wherein the pre-set schedule is determined based on expected user activities on said at least one client station during one or more particular days and times;
- a central control station in communication with each of the at least one client station over a network, the central control station having a screen saver monitoring module for monitoring the number of times the screen saver module associated with at least one client station has activated or deactivated a screen saver, and the central control station operable to generate and transmit the control signal comprising at least some of the one or more parameters based on the monitoring of the screen saver module associated with the at least one client station;
- the screen saver control module further comprising:
  - a local control module for controlling the screen saver modules of select client stations;
  - a temporal control module for defining when the screen saver modules enable/disable or activate/deactivate screen savers according to at least one temporal parameter, the at least one temporal parameter comprising a pre-set schedule specifying when a screen saver is to be enabled or its activation behavior is to be changed;
  - a connectivity control module for controlling the screen saver modules according to at least one connectivity parameter that changes activation behavior of the screen saver based at least on whether the at least one client station is connected to a network; and
  - an interaction module for monitoring use and/or screen saver activity at each of the at least one client station, wherein the user and/or screen saver activity comprises at least one parameter relating to: (1) screen saver activation, (2) user inactivity, or (3) user control of the screen saver module.

19. A system for controlling screen saver activation and functionality, comprising:
- a plurality of client stations, wherein each of the client stations has a screen saver module associated therewith, wherein the screen saver module is operable to at least activate or deactivate a screen saver; and
- a central control station in communication with the plurality of client stations over a network, the central control station having a screen saver control module for controlling each of the screen saver modules associated with the plurality of client stations, wherein the screen saver control module is operable to transmit control signals over a network to the plurality of client stations;
- the screen saver control module further comprising:
  - a global control module for simultaneously controlling all of the screen saver modules associated with the at least one client station;
  - a local control module for controlling the screen saver modules of select client stations;
  - a temporal control module for defining when the screen saver modules enable/disable or activate/deactivate screen savers according to at least one temporal parameter, the at least one temporal parameter comprising a pre-set schedule specifying when a screen saver is to be enabled or its activation behavior is to be changed, wherein the pre-set schedule is determined based on expected user activities on said at least one client station during one or more particular days and times; and a connectivity control module for controlling the screen saver modules according to at least one connectivity parameter that changes activation behavior of the screen saver based at least on whether the at least one client station is connected to a network.

* * * * *